US007100001B2

(12) United States Patent
Edirisooriya et al.

(10) Patent No.: US 7,100,001 B2
(45) Date of Patent: Aug. 29, 2006

(54) METHODS AND APPARATUS FOR CACHE INTERVENTION

(75) Inventors: Samantha J. Edirisooriya, Tempe, AZ (US); Sujat Jamil, Chandler, AZ (US); David E. Miner, Chandler, AZ (US); R. Frank O'Bleness, Tempe, AZ (US); Steven J. Tu, Phoenix, AZ (US); Mark N. Fullerton, Austin, TX (US); Hang T. Nguyen, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 318 days.

(21) Appl. No.: 10/073,492

(22) Filed: Feb. 11, 2002

(65) Prior Publication Data

US 2003/0154350 A1 Aug. 14, 2003

Related U.S. Application Data

(63) Continuation-in-part of application No. 10/057,493, filed on Jan. 24, 2002, now Pat. No. 6,775,748.

(51) Int. Cl.
*G06F 12/00* (2006.01)

(52) U.S. Cl. ............ 711/147; 711/130; 711/122; 711/152

(58) Field of Classification Search ........... 711/119, 711/122, 133, 134, 141, 146, 144, 145, 130, 711/152, 147, 163; 365/189.04, 230.05
See application file for complete search history.

(56) References Cited

U.S. PATENT DOCUMENTS

| | | | |
|---|---|---|---|
| 5,369,753 A | | 11/1994 | Tipley |
| 5,664,150 A | | 9/1997 | Isaac et al. |
| 5,765,199 A | * | 6/1998 | Chang et al. .............. 711/168 |
| 5,802,577 A | * | 9/1998 | Bhat et al. .................. 711/146 |
| 5,867,162 A | * | 2/1999 | O'Leary et al. ............ 345/843 |
| 5,909,697 A | * | 6/1999 | Hayes et al. ................ 711/144 |
| 5,913,226 A | | 6/1999 | Sato |
| 5,943,684 A | | 8/1999 | Arimilli et al. |
| 5,996,049 A | | 11/1999 | Arimilli et al. ............ 711/141 |
| 6,073,211 A | | 6/2000 | Cheng et al. |
| 6,170,040 B1 | | 1/2001 | Lee et al. |

(Continued)

OTHER PUBLICATIONS

Handy, "The Cache Memory Book", © 1998 Academic Press, Inc. , 2nd edition, p. 126, 127, 156-186.*

(Continued)

*Primary Examiner*—Brian R. Peugh
(74) *Attorney, Agent, or Firm*—Hanley, Flight & Zimmerman, LLC

(57) ABSTRACT

Methods and apparatus for cache-to-cache block transfers (i.e., intervention) when the state of the transferred block is in a non-modified state (e.g., "exclusive" or "shared") are provided. In one embodiment, a first cache holds the memory block in an "exclusive" state prior to the transfer. When a processor associated with a second cache attempts to read the block from a main memory, the first cache intervenes and supplies the block to the second cache. The state of the block in the first cache changes from "exclusive" to "shared." In another embodiment, a processor associated with a third cache attempts to read the block from the main memory while the first cache and the second both hold the block in the "shared" state. Either the first cache or the second cache wins an arbitration and supplies the block to the third cache.

32 Claims, 4 Drawing Sheets

U.S. PATENT DOCUMENTS

| | | | |
|---|---|---|---|
| 6,266,744 B1 * | 7/2001 | Hughes et al. | 711/146 |
| 6,321,297 B1 | 11/2001 | Shamanna et al. | |
| 6,345,340 B1 | 2/2002 | Arimilli et al. | |
| 6,360,301 B1 | 3/2002 | Gaither et al. | |
| 6,378,048 B1 | 4/2002 | Prudvi et al. | |
| 6,425,060 B1 * | 7/2002 | Mounes-Toussi et al. | 711/158 |
| 6,438,660 B1 | 8/2002 | Reams | |
| 6,519,685 B1 * | 2/2003 | Chang | 711/141 |
| 6,549,989 B1 | 4/2003 | Arimilli et al. | |
| 6,549,990 B1 | 4/2003 | Hughes et al. | |
| 6,574,710 B1 | 6/2003 | Gaither et al. | |
| 6,615,322 B1 | 9/2003 | Arimilli et al. | |
| 6,615,323 B1 * | 9/2003 | Petersen et al. | 711/146 |
| 6,629,212 B1 | 9/2003 | Arimilli et al. | |
| 6,694,409 B1 * | 2/2004 | Chang | 711/141 |
| 6,775,748 B1 | 8/2004 | Jamil et al. | |
| 6,834,327 B1 | 12/2004 | Lyon | |
| 2003/0154352 A1 | 8/2003 | Jamil et al. | |

OTHER PUBLICATIONS

Lee, "A Secondary Cache Controller Design for a High-End Microprocessor", © 1992 IEEE, p. 1141-1146.*

Tomasevic, M; Milutinovic, V. "Hardware Approaches to Cache Coherence in Shared-Memory Multiprocessors, Part 1." IEEE Micro. vol. 14, Issue 5, pp. 52-59. Oct. 1994.

Tomasevic, M; Milutinovic, V. "Hardware Approaches to Cache Coherence in Shared-Memory Multiprocessors, Part 2." IEEE Micro. vol. 14, Issue 6, pp. 61-66. Dec. 1994.

*Intel® Itanium™ Processor Hardware Developer's Manual*, printed from ftp://download.intel.com/design/Itanium/Downloads/24870102.pdf, document No. 248701-002. (Aug. 2001).

*Intel® Itanium™ 2 Processor Hardware Developer's Manual*, ftp://download.intel.com/design/Itanium2/manuals/25110901.pdf, document No. 251109-001. (Jul. 2002).

*Intel® Pentium™ 4 Processor with 512-KB L2 Cache on 0.13 Micron Process Datasheet*. ftp://download.intel.com/design/Pentium4/datashts/29864309.pdf. Document No. 298643-009.(May 2003).

* cited by examiner

RH - Read Hit
RMS - Read Miss, Shared
RME - Read Miss, Exclusive
WH - Write Hit
WM - Write Miss
SHR - Snoop Hit on a Read
SHRBO – Snoop Hit on a Read with Back Off
SHRNBO – Snoop Hit on a Read with no Back Off
SHW - Snoop Hit on a Write or Read With Intent to Modify (I) - Invalidate
(R) - Cache line Fill
(S) - Snoop Push
(RM) - Read With Intent to Modify

METHODS AND APPARATUS FOR CACHE INTERVENTION

This patent arises from a continuation-in-part of U.S. patent application Ser. No. 10/057,493, which was filed on Jan. 24, 2002 and which has issued as U.S. Pat. No. 6,775,748.

TECHNICAL FIELD

The present invention relates in general to cache memory and, in particular, to methods and apparatus for cache intervention.

BACKGROUND

In an effort to increase computational power, many computing systems are turning to multi-processor systems. A multi-processor system typically includes a plurality of microprocessors, a plurality of associated caches, and a main memory. In an effort to reduce bus traffic to the main memory, many multi-processor systems use a "write-back" (as opposed to a "write-through") policy. A "write-back" policy is a cache procedure whereby a microprocessor may locally modify data in its cache without updating the main memory until the cache data needs to be replaced. In order to maintain cache coherency in such a system, a cache coherency protocol may be used.

One problem with a "write-back" policy is sourcing a read request from one cache when another cache is holding the requested memory block in a modified state (i.e., the data is "dirty"). If the requesting cache is allowed to read the data from main memory, the value of the data will be incorrect. In order to solve this problem, some protocols abort the read operation, require the cache with the "dirty" data to update the main memory, and then allow the requesting cache to "retry" the read operation. However, this process adds latency to the read operation and increases bus traffic to the main memory. In an effort to further reduce bus traffic to the main memory, other protocols allow a first cache that is holding locally modified data (i.e., "dirty" data) to directly supply a second cache that is requesting the same block, without updating main memory.

BRIEF DESCRIPTION OF THE DRAWINGS

Features and advantages of the disclosed methods and apparatus will be apparent to those of ordinary skill in the art in view of the detailed description of certain embodiments which is made with reference to the drawings, a brief description of which is provided below.

DETAILED DESCRIPTION OF EXAMPLE EMBODIMENTS

In general, the methods and apparatus described herein provide for cache-to-cache block transfers from a first cache to a second cache (i.e., cache intervention) when the state of the transferred block is in a non-modified state (e.g., "exclusive" or "shared"). In a first embodiment, the first cache holds the memory block in an "exclusive" state prior to the block transfer, and the second cache does not hold the memory block. When a processor associated with the second cache attempts to read the block from a main memory, the first cache intervenes and supplies the block instead of main memory supplying the block. The memory block in the second cache is stored in a "shared" state. In addition, the state of the memory block in the first cache changes from "exclusive" to "shared." In a second embodiment, a processor associated with a third cache attempts to read the block from the main memory while the first cache and the second both hold the memory block in the "shared" state. Either the first cache or the second cache is determined to be an arbitration winner, and the arbitration winner intervenes and supplies the block. In both embodiments, communications with main memory and power consumption are reduced.

Figure 1:
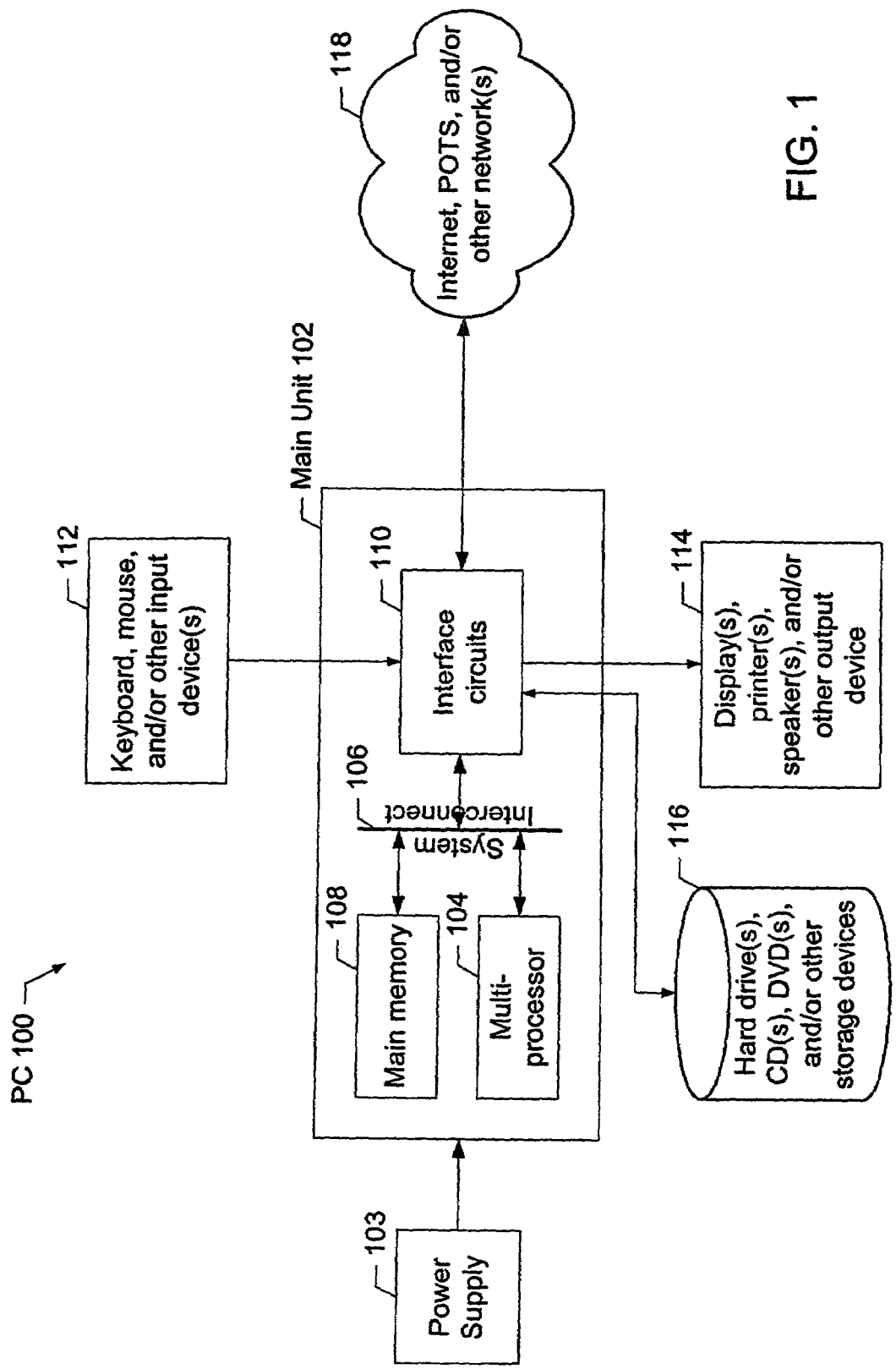
FIG. 1 is a high level block diagram of a computer system illustrating an environment of use for the present invention.

A block diagram of a computer system 100 is illustrated in FIG. 1. The computer system 100 may be a personal computer (PC), a personal digital assistant (PDA), an Internet appliance, a cellular telephone, or any other computing device. For one embodiment, the computer system 100 includes a main processing unit 102 powered by a power supply 103. The main processing unit 102 may include a multi-processor unit 104 electrically coupled by a system interconnect 106 to a main memory device 108 and one or more interface circuits 110. For one embodiment, the system interconnect 106 is a address/data bus. Of course, a person of ordinary skill in the art will readily appreciate that interconnects other than busses may be used to connect the multi-processor unit 104 to the main memory device 108. For example, one or more dedicated lines and/or a crossbar may be used to connect the multi-processor unit 104 to the main memory device 108.

The multi-processor 104 may include any type of well known central processing unit (CPU), such as a CPU from the Intel Pentium™ family of microprocessors, the Intel Itanium™ family of microprocessors, and/or the Intel XScale™ family of processors. In addition, the multi-processor 104 may include any type of well known cache memory, such as static random access memory (SRAM). The main memory device 108 may include dynamic random access memory (DRAM) and/or non-volatile memory. For one embodiment, the main memory device 108 stores a software program which is executed by the multi-processor 104 in a well known manner.

The interface circuit(s) 110 may be implemented using any type of well known interface standard, such as an Ethernet interface and/or a Universal Serial Bus (USB) interface. One or more input devices 112 may be connected to the interface circuits 110 for entering data and commands into the main processing unit 102. For example, an input device 112 may be a keyboard, mouse, touch screen, track pad, track ball, isopoint, and/or a voice recognition system.

One or more displays, printers, speakers, and/or other output devices 114 may also be connected to the main processing unit 102 via one or more of the interface circuits 110. The display 114 may be cathode ray tube (CRTs), liquid crystal displays (LCDs), or any other type of display. The display 114 may generate visual indications of data generated during operation of the main processing unit 102. The visual displays may include prompts for human operator input, calculated values, detected data, etc.

The computer system 100 may also include one or more storage devices 116. For example, the computer system 100 may include one or more hard drives, a compact disk (CD)

drive, a digital versatile disk drive (DVD), and/or other computer media input/output (I/O) devices.

The computer system 100 may also exchange data with other devices via a connection to a network 118. The network connection may be any type of network connection, such as an Ethernet connection, digital subscriber line (DSL), telephone line, coaxial cable, etc. The network 118 may be any type of network, such as the Internet, a telephone network, a cable network, and/or a wireless network.

Figure 2:
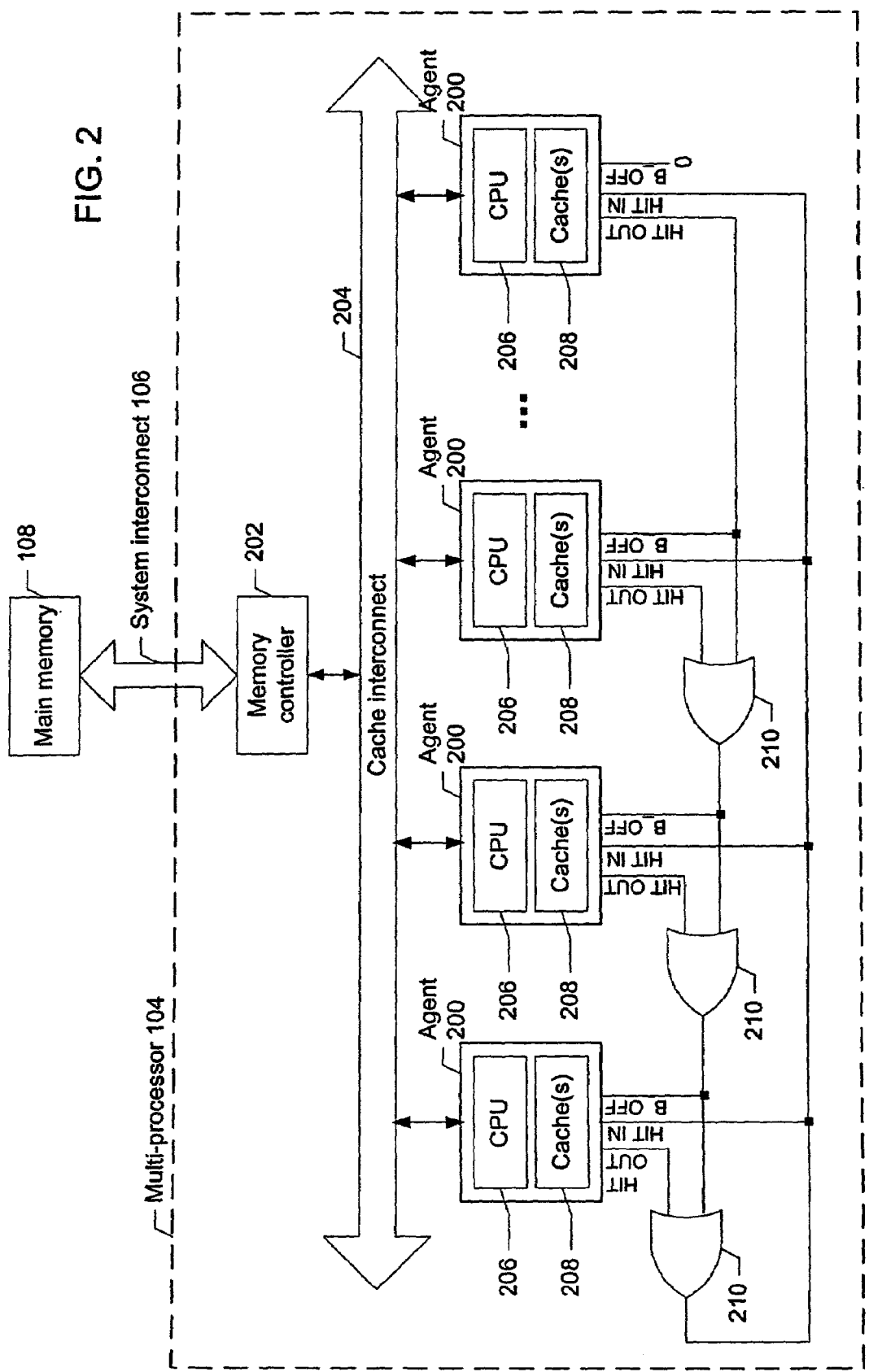
FIG. 2 is a more detailed block diagram of the multi-processor illustrated in FIG. 1.

A more detailed block diagram of the multi-processor unit 104 is illustrated in FIG. 2. Although certain signal names are used to describe this embodiment, a person of ordinary skill in the art will readily appreciate that the name of each of the signal lines described herein is irrelevant to the operation of the signal line. Similarly, although certain connection schemes and logic gates are used to describe this embodiment, a person of ordinary skill in the art will readily appreciate that many other connection schemes and/or logic gates may be used without departing from the scope or spirit of the present invention.

In the embodiment illustrated in FIG. 2, the multi-processor 104 includes a plurality of processing agents 200 and a memory controller 202 electrically coupled by a cache interconnect 204. The cache interconnect 204 may be any type of interconnect such as a bus, one or more dedicated lines, and/or a crossbar. Each of the components of the multi-processor 104 may be on the same chip or on separate chips. For one embodiment, the main memory 108 resides on a separate chip. Due to the memory controller 202, one processing agent 200 may communicate with another processing agent 200 via the cache interconnect 204 without the communication necessarily generating activity on the system interconnect 106. Typically, if activity on the system interconnect 106 is reduced, overall power consumption is reduced. This is especially true in an embodiment where the main memory 108 resides on a separate chip from the processing agents 200.

Each processing agent 200 may include a central processing unit (CPU) 206 and one or more cache(s) 208. As discussed above, each CPU 206 may be any type of well known processor such as an Intel Pentium™ processor. Similarly, each cache may be constructed using any type of well known memory, such as SRAM. In addition, each processing agent 200 may include more than one cache. For example, a processing agent may include a level 1 cache and a level 2 cache. Similarly, a processing agent may include an instruction cache and/or a data cache.

Each processing agent 200 may include at least one signal input and at least one signal output. For one embodiment, a "hit out" signal output is asserted when an agent 200 detects activity on the cache interconnect 204 associated with a memory location for which the agent 200 is currently holding a copy in its cache 208. For one embodiment, each agent "snoops" address lines on a cache interconnect bus and asserts "hit out" each time it sees an address associated with a memory block in its cache. For example, if a second agent initiates a read request, and a first agent holds a copy of the same memory block in its cache, the first agent may assert its "hit out" line.

For one embodiment, one or more of these "hit out" lines are connected to a "hit in" line on each processing agent 200. For one embodiment, all of the "hit out" lines are logically ORed together, by one or more OR gates 210, and the output of the OR gate(s) 210 is connected to each of the "hit in" lines as shown in FIG. 2. In this manner, an active processing agent 200 knows when the cache 208 of another processing agent 200 holds a memory block associated with an activity the active processing agent 200 is performing. However, the active processing agent 200 does not necessarily know which cache 208 holds the memory block. Each processing agent 200 may be structured to use this "hit in" line to initiate and/or cancel any activity the processing agent 200 is capable of performing. For example, an asserted "hit in" line may serve to cancel a read from main memory.

In addition, one or more of the "hit out" lines are connected to a "back-off" input on each processing agent 200. For one embodiment, a first processing agent 200 optionally includes a "back-off" input which is never asserted (e.g., the input is connected to logic zero). This processing agent 200 has the highest priority in an arbitration scheme described in detail below (i.e., no other agent ever tells this agent to "back-off"). A second processing agent 200 may include a "back-off" input which is connected only to the "hit out" of the first processing agent. This processing agent has the second highest priority (i.e., only the highest priority agent can tell this agent to "back-off"). If included in the system, a third processing agent 200 may include a "back-off" input which is connected to the output of a first OR gate 210. The inputs of the first OR gate 210 are in turn connected to the "hit out" signals of the first processing agent 200 and the second processing agent 200. This processing agent has the third highest priority (i.e., either of the highest priority agent and the second highest priority agent can tell this agent to "back-off"). If included in the system, a fourth processing agent 200 may include a "back-off" input which is connected to the output of a second OR gate 210. The inputs of the second OR gate 210 are in turn connected to the "hit out" signal of the third processing agent 200 and the output of the first OR gate 210. This processing agent 200 has the fourth highest priority (i.e., any of the first three agents can tell this agent to "back-off"). This pattern may continue for any number of processing agents 200 as shown in FIG. 2. From the foregoing, persons of ordinary skill in the art will readily appreciate that, in the above example, the one or more OR gates 210 and the back-off inputs to the processing agents 200 are an arbitration circuit enforcing a fixed cache intervention priority between the caches 208. Thus, the one or more OR gates 210 and the back-off inputs are hardware which enforces a permanent hierarchy between the caches 208. This hierarchy is physically defined by the circuitry.

Figure 3:
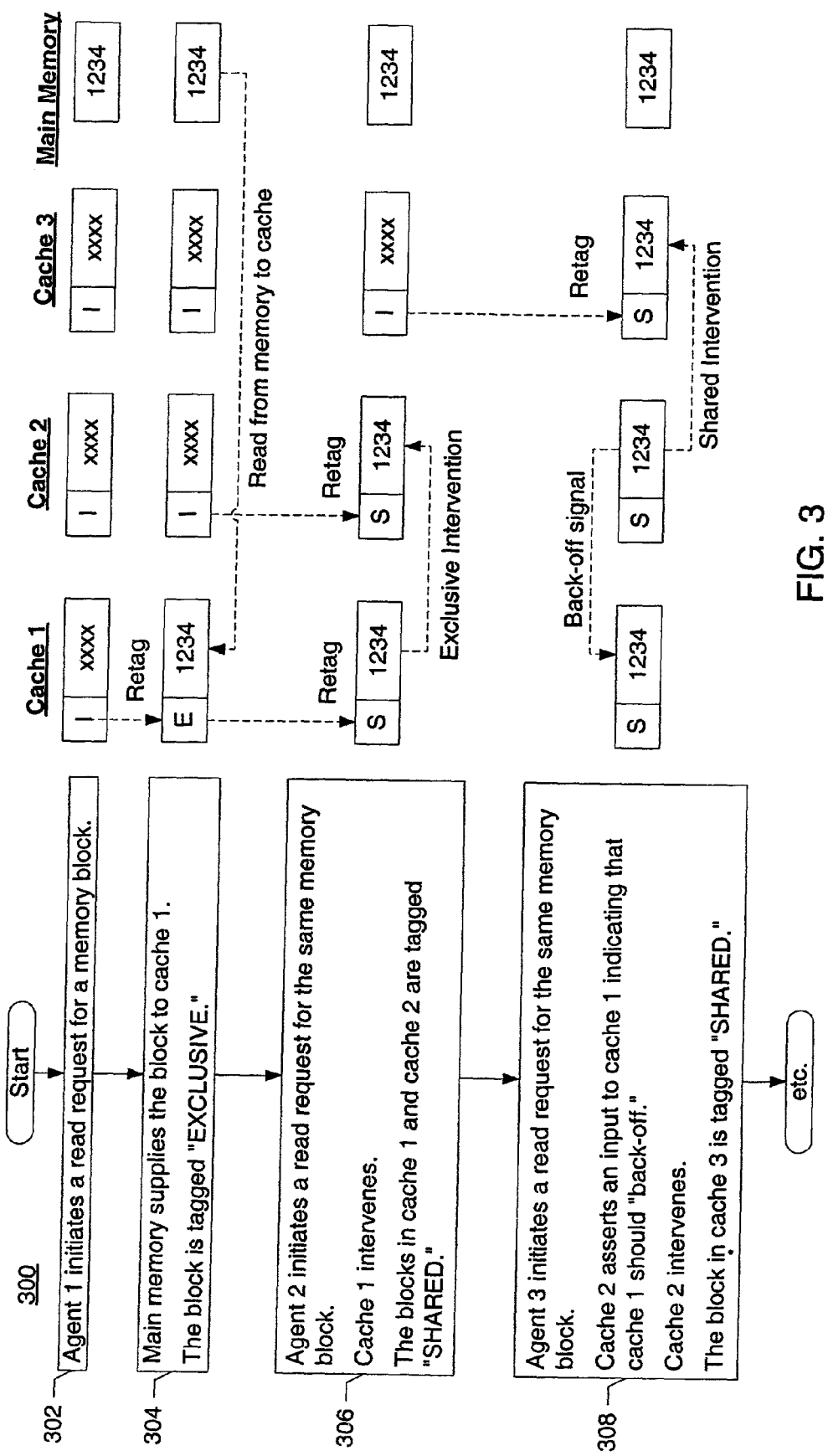
FIG. 3 is a flowchart of a process for cache intervention in a multi-processor system.
Figure 4:
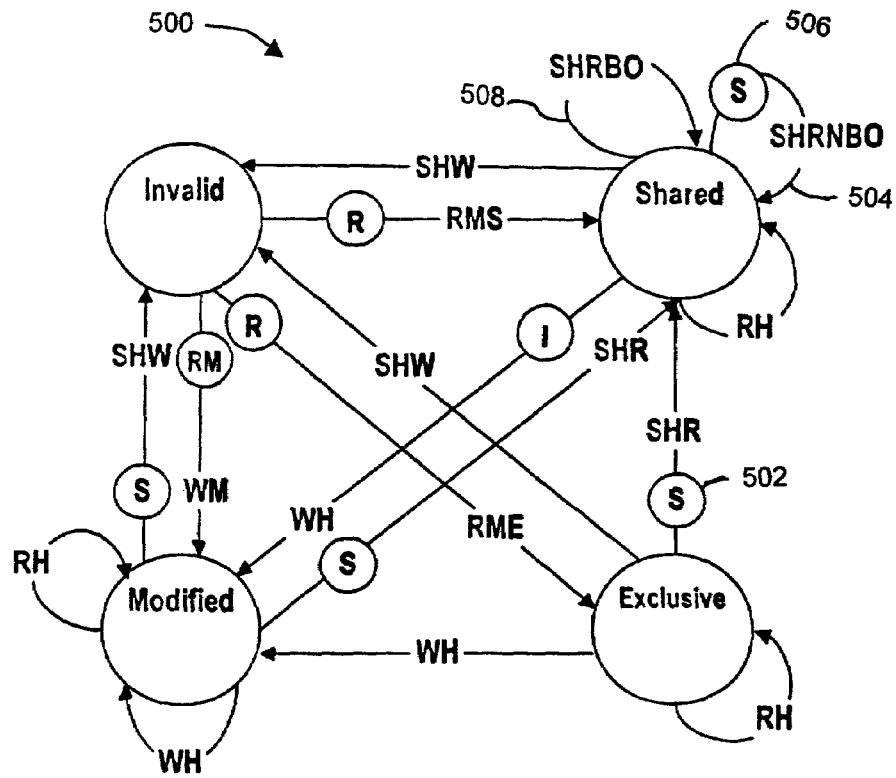
FIG. 4 is a state diagram of a MESI cache coherency protocol amended to include "exclusive" intervention and "shared" intervention.

A flowchart of a process 300 for cache intervention is illustrated in FIGS. 3–4. Adjacent each operation in the illustrated process 300 is a block diagram illustrating example actions taken by each of a first cache 208, a second cache 208, a third cache 208, and a main memory 108 during the associated operation. For simplicity in description, only one short memory block is illustrated for each of the first cache 208, the second cache 208, the third cache 208, and the main memory 108. Although the process 300 is described with reference to the flowchart illustrated in FIGS. 3–4, a person of ordinary skill in the art will readily appreciate that many other methods of performing the acts associated with process 300 may be used. For example, the order of some of the operations may be changed without departing from the scope or spirit of the present invention. In addition, many of the operations described are optional, and many additional operations may occur between the operations illustrated.

For one embodiment, a "write-back" (as opposed to a "write-through") policy is used. A "write-back" policy is a cache procedure whereby a cache agent 200 may locally modify data in its cache 208 without updating main memory 108 until the cache block needs to be replaced. In order to maintain cache coherency in such a system, a cache coherency protocol may be used.

In one embodiment, a MESI (i.e., modified, exclusive, shared, invalid) cache coherency protocol is followed. However, a person of ordinary skill in the art will readily appreciate that any cache coherency protocol which includes the equivalent of a "non-modified" state, an "exclusive" state, and/or a "shared" state may be used without departing from the scope or spirit of the present invention. For example, a MOESI, ESI, Berkeley, or Illinois cache coherency protocol may be used. In the well known MESI cache coherency protocol, an "invalid" block is a block that does not contain useful data (i.e., the block is effectively empty). An "exclusive" block is a block that is "non-modified" (i.e., the same as main memory) and only (e.g., the block was just read in from main memory for the first time). A "modified" block is a block that is "dirty" (i.e., different from main memory) and only held by one cache 208 (e.g., a new value was written to the cache copy, but not to main memory's copy). A "shared" block is a block that is held by more than one cache 208. If a MOESI type protocol is used, an "owned" state is added. An "owned" block is a block that is "modified" and "shared" (i.e., "dirty" and held by another cache). The "owner" of a block is responsible for eventually updating main memory 108 with the modified value (i.e., the "owner" is responsible for performing the write-back).

In one embodiment, the state of a cached memory block is recorded in a cache directory. In another embodiment, the state of a cached memory block is recorded in a tag associated with the cached memory block. In the MOESI cache coherency protocol there are five possible states. Accordingly, each state may be represented by a different digital combination (e.g., 000=Modified, 001=Owned, 010=Exclusive, 011=Shared, 100=Invalid). Retagging a cached memory block is the act of changing the state of the cached memory block. For example, retagging a block from "exclusive" to "shared" may be accomplished by changing a tag associated with the block from "010" to "011." Of course, a person of ordinary skill in the art will readily appreciate that any method of storing and changing a cache block state may be used without departing from the scope and spirit of the present invention.

Generally, process 300 illustrates an example "exclusive" cache intervention and an example "shared" cache intervention. In the "exclusive" cache intervention example, the first cache holds a memory block in an "exclusive" state prior to a block transfer, and a second cache does not hold the memory block. When a processor associated with the second cache attempts to read the block from a main memory, the first cache intervenes and supplies the block instead of main memory supplying the block. For one embodiment, the memory block in the second cache is stored in a "shared" state. In addition, the state of the memory block in the first cache may change from "exclusive" to "shared."

In the "shared" cache intervention example, a processor associated with a third cache attempts to read the block from the main memory while the first cache and the second both hold the memory block in the "shared" state. Either the first cache or the second cache is determined to be an arbitration winner, and the arbitration winner intervenes and supplies the block. Of course, any number of caches may be used with any type of arbitration scheme. In both examples, communications with main memory and power consumption are reduced.

The process 300 begins when a first processing agent 200 initiates a read request for a particular memory block (operation 302). In this example, the first cache 208 includes a position that is tagged "invalid." Of course, a person of ordinary skill in the art will readily appreciate that a cache position need not be tagged invalid to be over-written, and many well known cache replacement protocols, such as least recently used (LRU), may be used to determine which cache position is to be over-written.

No other cache 208 currently holds the requested memory block (e.g., no "hit" is generated or a cache directory indicates that no other caches holds the requested block), so main memory 108 supplies the requested block (operation 304). This action requires the memory controller 202 to access the main memory 108 via the system interconnect 106. The cached block is tagged "exclusive" to indicate that no other cache 208 currently holds this block (operation 304).

If the second processing agent 200 initiates a read request for the same memory block, the first cache 208 detects a "hit" (e.g., by snooping the address bus shared by the first and second agents or using a cache directory) (operation 306). Because the first cache 208 is holding the block in the "exclusive" state (i.e., the block in the first cache is the same as the block in main memory), main memory 108 could be allowed to supply the block, as requested by the second processing agent 200. However, the first cache 208 may intervene and supply the block via the cache interconnect 204 in order to reduce traffic on the system interconnect 106 (operation 306). The memory blocks in both the first cache 208 and the second cache 208 may be tagged "shared" to indicate that another cache 208 also holds this memory block (operation 306). In other words, if either cache 208 writes to this block, the other cache 208 needs to be updated or invalidated. Significantly, in operation 306, a first processing agent 200 intervenes to supply a block held in an "exclusive" state to a second processing agent 200.

If the third processing agent 200 also initiates a read request for the same memory block, the first and second caches 208 both detect a "hit" (e.g., by snooping the address bus or via a cache directory) (operation 308). As a result, the second cache 208 may assert the "back-off" input of the first cache (operation 308). Because the first cache 208 and the second cache 208 are both holding the block in the "shared" state (i.e., the cache blocks are the same as the block in main memory), main memory 108 could be allowed to supply the block, as requested by the third processing agent 200. However, the second cache 208 may intervene and supplies the block via the cache interconnect 204 in order to reduce traffic on the system interconnect 106 (operation 308). The first cache 208 knows to let another cache 208 (i.e., the second cache) supply the block because the "back-off" input of the first cache is asserted. The memory block in the third cache 208 may be tagged "shared" to indicate that another cache 208 also holds this memory block (operation 308). Significantly, in operation 308, one processing agent 200 intervenes to supply a block held in a "shared" state to another processing agent 200, and the intervening agent 200 also asserts a signal to suppress yet another agent 200 from supplying the same block.

A state diagram 500 of a MESI cache coherency protocol amended to include "exclusive" intervention and "shared" intervention is illustrated in FIG. 4. In addition to the state transitions normally associated with the well known MESI cache coherency protocol, two transitions are modified and one transition is added.

First, a "snoop push" operation 502 is added to the "exclusive-to-shared" transition associated with a "snoop hit on read." A "snoop push" operation is a cache operation in which a first cache supplies a memory block to a second cache instead of a main memory supplying the second cache. A cache following this amended protocol will intervene to supply an "exclusive" block to a requesting cache and change the state of the supplied block to "shared."

Second, a "shared-to-shared" transition 504 associated with a "snoop hit on read with no back-off" is added, and this new transition includes a "snoop push" operation 506. A cache following this amended protocol will intervene to supply a "shared" block to a requesting cache without changing the state of the supplied block. This protocol could be followed, for example, by the cache that wins the arbitration in a shared block situation.

Third, the "shared-to-shared" transition 508 normally associated with a "snoop hit on read" is modified to additionally check if a "back-off" signal is asserted. There is no "snoop push" associated with this transition. Accordingly, a cache with a shared block that is told to "back-off," will not place traffic on the cache interconnect 204. This modification to the standard MESI protocol allows another cache that does not receive a "back-off" signal to intervene in accordance with the new SHRNBO transition 504 without contention on the cache interconnect 204. Of course, a person of ordinary skill in the art will readily appreciate that other arbitration schemes may be similarly employed.

In summary, persons of ordinary skill in the art will readily appreciate that methods and apparatus for cache intervention has been provided. Systems implementing the teachings described herein may benefit from a reduction in memory latency, bus traffic, and power consumption.

The foregoing description has been presented for the purposes of illustration and description. It is not intended to be exhaustive or to limit the invention to the example embodiments disclosed. Many modifications and variations are possible in light of the above teachings. It is intended that the scope of the invention be limited not by this detailed description of example embodiments, but rather by the claims appended hereto.

What is claimed is:

1. A method of cache intervention comprising:
   reading a memory block into a first cache from a main memory;
   copying the memory block from the first cache to a second cache in response to a read request associated with the second cache;
   tagging the memory block in the first cache as non-modified;
   detecting a read request associated with a third cache that hits the first cache and the second cache;
   if the memory block in the first cache and the memory block in the second cache are both tagged as non-modified, selecting the first cache or the second cache as an arbitration winner cache based on a fixed hardware arbitration hierarchy; and
   providing a copy of the memory block from the arbitration winner cache responsive to the read request.

2. A method as defined in claim 1, wherein tagging the memory block in the first cache as non-modified comprises tagging the memory block in the first cache as exclusive.

3. A method as defined in claim 1, wherein tagging the memory block in the first cache as non-modified comprises tagging the memory block in the first cache as shared.

4. A method as defined in claim 1, further comprising tagging the memory block in the second cache as shared.

5. A method as defined in claim 1, wherein detecting a read request comprises snooping a bus.

6. A method as defined in claim 1, wherein detecting a read request comprises accessing a cache directory.

7. A method as defined in claim 1, further comprising tagging the memory block in the third cache as non-modified.

8. A method of cache intervention comprising:
   reading a memory block into a first cache from a main memory;
   tagging the memory block in the first cache as non-modified;
   detecting a read request associated with the memory block that hits an agent associated with a second cache;
   providing a copy of the memory block from the first cache responsive to the read request;
   detecting a read request associated with the memory block that hits an agent associated with a third cache;
   determining an arbitration winner cache between the first cache and the second cache if the memory block in the first cache is tagged as non-modified and the memory block in the second cache is tagged as non-modified;
   copying the memory block from the arbitration winner cache to the third cache; and
   tagging the memory block in the third cache as non-modified, wherein determining an arbitration winner cache comprises selecting a directory entry associated with the first cache or the second cache.

9. A method of cache intervention comprising:
   reading a memory block into a first cache from a main memory;
   tagging the memory block in the first cache as non-modified;
   detecting a read request associated with the memory block that hits an agent associated with a second cache;
   providing a copy of the memory block from the first cache responsive to the read request;
   detecting a read request associated with the memory block that hits an agent associated with a third cache;
   determining an arbitration winner cache between the first cache and the second cache if the memory block in the first cache is tagged as non-modified and the memory block in the second cache is tagged as non-modified;
   copying the memory block from the arbitration winner cache to the third cache; and
   tagging the memory block in the third cache as non-modified, wherein determining an arbitration winner cache comprises usage of a back-off based arbitration mechanism.

10. A multi-processing computing device comprising:
    a first processing agent including a first processor and a first cache;
    a second processing agent including a second processor and a second cache, the second processing agent being coupled to the first processing agent via a cache interconnect;
    a third processing agent including a third processor and a third cache, the third processing agent being coupled to the first processing agent and the second processing agent via the cache interconnect;
    an arbitration circuit enforcing a fixed cache intervention priority between the first processing agent, the second processing agent and the third processing agent; and
    a main memory coupled to the first processing agent, the second processing agent and the third processing agent via a main memory interconnect, the first processing agent to (i) read a memory block into the first cache from the main memory via the main memory interconnect, (ii) tag the memory block in the first cache with an exclusive tag, and (iii) supply the memory block tagged exclusive to the second cache via the cache interconnect.

11. A multi-processing computing device as defined in claim 10, wherein the first processing agent is to detect a read request associated with the memory block by the second processing agent and retag the memory block in the first cache as shared in response to detecting the read request.

12. A multi-processing computing device as defined in claim 11, wherein the first processing agent is to detect the read request associated with the memory block by snooping the cache interconnect.

13. A multi-processing computing device as defined in claim 11, wherein the first processing agent or the second processing agent are to supply the memory block tagged shared to a third cache via the cache interconnect.

14. A multi-processing computing device comprising:
a first processing agent including a first processor, a first cache, and a signal input, the first cache to store a memory block in a shared state;
a second processing agent including a second processor, a second cache, and a signal output, the second cache to store the memory block in the shared state, the signal output being coupled to the signal input; and
a third processing agent including a third processor and a third cache, the second processing agent to supply the memory block tagged shared to the third cache, the second processing agent to prevent the first processing agent from supplying the memory block tagged shared to the third cache by asserting the signal output.

15. A multi-processing computing device as defined in claim 14, further comprising a logical OR unit, the logical OR unit including a first OR input, a second OR input, and an OR output, the first OR input being coupled to the signal output of the second processing agent, the second OR input being coupled to the third processing agent, the OR output being coupled to the signal input of the first processing agent.

16. A multi-processing computing device as defined in claim 14, further comprising a logical OR unit and a fourth processing agent, the logical OR unit including a first OR input, a second OR input, and an OR output, the first OR input being coupled to the signal output of the second processing agent, the second OR input being coupled to the fourth processing agent, the OR output being coupled to the signal input of the first processing agent.

17. A computer comprising:
a first microprocessor including a first cache, the first cache to store a first copy of a memory block in a non-modified state;
a second microprocessor including a second cache to store a second copy of the memory block in the non-modified state;
a third microprocessor including a third cache; and
a main memory coupled to the first microprocessor, the second microprocessor and the third microprocessor, the first microprocessor or the second microprocessor to supply the third cache with a third copy of the memory block based on a physically predetermined arbitration hierarchy while the first copy of the memory block and the second copy of the memory block are in the non-modified state.

18. A computer as defined in claim 17, wherein the first microprocessor is to supply the second cache with the second copy of the memory block while the first copy of the memory block is in an exclusive state or a shared state.

19. A computer as defined in claim 17, wherein the main memory is operatively connected to the first microprocessor and the second microprocessor by a main memory bus, the first microprocessor to directly supply the second cache with the second copy of the memory block while the first copy of the memory block is in the non-modified state.

20. A computer comprising:
a first microprocessor including a first cache, the first cache to store a first copy of a memory block in a non-modified state;
a second microprocessor including a second cache to store a second copy of the memory block in the non-modified state;
a third microprocessor including a third cache; and
a main memory coupled to the first microprocessor, the second microprocessor and the third microprocessor, the first microprocessor or the second microprocessor to supply the third cache with a third copy of the memory block based on a predetermined arbitration hierarchy while the first copy of the memory block and the second copy of the memory block are in the non-modified state, wherein the main memory is operatively connected to the first microprocessor and the second microprocessor by a main memory bus, the first microprocessor to directly supply the second cache with the second copy of the memory block while the first copy of the memory block is in the non-modified state;
a mother board coupled to the first microprocessor;
a hard drive coupled to the first microprocessor; and
a graphics card coupled to the first microprocessor.

21. A computer as defined in claim 20, further comprising:
an input device coupled to the first microprocessor; and
an output device coupled to the first microprocessor.

22. A computer as defined in claim 21, wherein the input device comprises at least one of a keyboard, a mouse, a track pad, an isopoint, a microphone, or a graphics tablet.

23. A computer as defined in claim 21, wherein the output device comprises at least one of a display, a printer, a modem, a network card, or a speaker.

24. A method of cache intervention comprising:
storing a memory block in a first cache in a shared state;
storing the memory block in a second cache in the shared state;
detecting a read request associated with the memory block by an agent associated with a third cache while the memory block in the first cache is in the shared state and the memory block in the second cache is in the shared state;
selecting the first cache or the second cache to provide a copy of the memory block to the third cache based on a permanent hardware hierarchy between the first and second caches; and
copying the memory block to the third cache in accordance with the selection.

25. A method as defined in claim 24, further comprising preventing a third cache from copying the memory block to the second cache.

26. A method of cache intervention comprising:
storing a memory block in a first cache in a shared state;
detecting a read request associated with the memory block by an agent associated with a second cache while the memory block in the first cache is in the shared state;
copying the memory block from the first cache to the second cache in response to detecting the read request while the memory block in the first cache is in the shared state; and preventing a third cache from copying the memory block to the second cache, wherein preventing a third cache from copying the memory block to the second cache comprises asserting a "back-off" signal.

27. A method of cache intervention comprising:

storing a memory block in a first cache in a shared state;

detecting a read request associated with the memory block by an agent associated with a second cache while the memory block in the first cache is in the shared state;

copying the memory block from the first cache to the second cache in response to detecting the read request while the memory block in the first cache is in the shared state; and preventing a third cache from copying the memory block to the second cache, wherein preventing a third cache from copying the memory block to the second cache comprises determining an arbitration winner cache represented in a cache directory.

28. A method of cache intervention comprising:

storing a first copy of a memory block in a first cache in an exclusive state or a shared state;

detecting a read request corresponding to a second cache and associated with the memory block;

supplying the second cache with a second copy of the memory block while the first copy of the memory block is in the exclusive state or the shared state without accessing a main memory; and preventing a third cache having a third copy of the memory block from supplying the second copy of the memory block to the second cache if the first and third copies of the memory block are in the shared state and the first cache has a higher cache intervention priority under a fixed hardware hierarchy defined between the first and second caches.

29. A method as defined in claim 28, wherein detecting a read request associated with the memory block comprises snooping a bus.

30. A method as defined in claim 28, wherein detecting a read request associated with the memory block comprises using a cache directory.

31. A method as defined in claim 28, wherein supplying the second cache with a second copy of the memory block while the first copy of the memory block is in the exclusive state or the shared state comprises supplying the second cache with the second copy of the memory block while the first copy of the memory block is in the exclusive state.

32. A method as defined in claim 28, wherein supplying the second cache with a second copy of the memory block while the first copy of the memory block is in the exclusive state or the shared state comprises supplying the second cache with the second copy of the memory block while the first copy of the memory block is in the shared state.

* * * * *